(12) United States Patent
Cunningham et al.

(10) Patent No.: US 7,838,469 B2
(45) Date of Patent: Nov. 23, 2010

(54) FUSING MATERIALS FOR PREVENTION OF LOST CIRCULATION

(75) Inventors: Eric Cunningham, Houston, TX (US); Emmanuel Therond, Houston, TX (US); Paulo Rubinstein, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 152 days.

(21) Appl. No.: 12/249,031

(22) Filed: Oct. 10, 2008

(65) Prior Publication Data

US 2009/0099047 A1 Apr. 16, 2009

Related U.S. Application Data

(60) Provisional application No. 60/998,491, filed on Oct. 11, 2007.

(51) Int. Cl.
*C09K 8/50* (2006.01)
*C08L 95/00* (2006.01)
*E21B 33/13* (2006.01)

(52) U.S. Cl. .................. 507/232; 106/273.1; 106/276; 106/285; 166/285; 166/294; 166/295; 166/305.1; 208/39

(58) Field of Classification Search ............... 507/232; 106/273.1, 276, 285; 166/285, 294, 295; 166/305.1; 208/39
See application file for complete search history.

(56) References Cited

U.S. PATENT DOCUMENTS

| 4,579,668 | A | | 4/1986 | Messenger | |
|---|---|---|---|---|---|
| 4,836,940 | A | * | 6/1989 | Alexander | 507/119 |
| 6,017,854 | A | | 1/2000 | Van Slyke | |
| 2001/0008876 | A1 | | 7/2001 | Crawford | |
| 2002/0128158 | A1 | | 9/2002 | Green | |
| 2004/0138067 | A1 | * | 7/2004 | Rayborn | 507/100 |
| 2004/0214728 | A1 | * | 10/2004 | Taylor et al. | 507/235 |
| 2004/0226746 | A1 | | 11/2004 | Schmidt et al. | |
| 2005/0269080 | A1 | | 12/2005 | Cowan | |
| 2006/0019834 | A1 | * | 1/2006 | Melbouci et al. | 507/100 |
| 2006/0252652 | A1 | | 11/2006 | Cowan | |

FOREIGN PATENT DOCUMENTS

WO     20070041420     4/2007

* cited by examiner

*Primary Examiner*—Timothy J. Kugel
(74) *Attorney, Agent, or Firm*—David Cate; Robin Nava; Jeff Griffin

(57) ABSTRACT

A method is given for reducing fluid loss in downhole operations such as drilling and completion. A composition containing a fusing solid is injected into the fluid loss flow path; the fusing solid fuses at formation temperature when the injection pressure is released and the formation matrix surfaces forming the flow path close on the composition. The fusing solid is gilsonite, or a similar material, or resin coated particles. The composition may optionally contain one or more of fibers, flakes, an activator, and a dispersant.

40 Claims, 4 Drawing Sheets

FUSING MATERIALS FOR PREVENTION OF LOST CIRCULATION

CROSS-REFERENCE TO RELATED APPLICATION

This application claims the benefit of U.S. Provisional Patent Application No. 60/998,491, filed on Oct. 11, 2007, now expired.

BACKGROUND OF THE INVENTION

The invention relates to slurries of materials that fuse under pressure to act as lost circulation prevention materials, fluid loss agents, or cementacious materials in oil and gas wells. In particular, it relates to such slurries containing fibers and materials that fuse together under pressure.

In drilling and completion operations in the oilfield, fluids such as drilling muds are sometimes lost to the surrounding formation through natural fractures, cracks, fissures, or vugs, or through fractures and the like created during treatments or through fractures and the like created by prior treatments. Lost circulation is reduced, or total, loss of fluid flow up the annulus when fluid is pumped down through a drillstring. Substances called loss control agents or lost-circulation control agents are added to drilling fluids and the like when fluids are being lost to the formation downhole. Commonly used lost-circulation materials include fibrous (cedar bark, shredded cane stalks, mineral fiber and hair), flaky (mica flakes and pieces of plastic or cellophane sheeting) or granular (ground and sized limestone or marble, wood, nut hulls, FORMICA™, corncobs and cotton hulls).

Granules, fibers and flakes in loss control agents are known (see for example U.S. Patent Application No. 2005/0269080), including all three in one slurry; see for example U.S. Pat. No. 4,579,668. Gilsonite has been used in drilling muds as an extender and as a lost circulation material on a regular basis.

SUMMARY OF THE INVENTION

One embodiment of the Invention is a method for reducing fluid loss in downhole operations. The method involves injecting a composition containing a fusing solid into the fluid loss flow path in a formation matrix and allowing the fusing solid to fuse at formation temperature when the injection pressure is released, and the formation matrix surfaces, that form the fluid loss flow path, close on the composition. The fusing solid may be gilsonite, asphalt, asphaltite, uintaite, uintahite, bitumen, wurzilite, glance pitch, grahamite, asphaltum, or mixtures of these materials. In a particularly preferred embodiment, the fusing solid is gilsonite. The composition may also contain fibers. The fibers may be selected from ceramics, glass, organic polymers, polyethylene terphthalate, aramids, novoloids, nylon, metals, aluminum, steel and mixtures of these materials. In a preferred embodiment, the fibers are glass or novoloid. The composition may also contain flakes. The flakes may be selected from mica, calcium carbonate, cellophane or mixtures of these materials. Mica is preferred. The composition may also contain a dispersant. The dispersant may be selected from lignosulfonates, lignites, humic acids, sulfonated styrene maleic anhydride copolymers, sulfonated naphthalene formaldehyde copolymers, polyacrylates, polyphosphates, modified tannins, zirconium citrate, dextrins, and mixtures of these materials.

In another embodiment, the fusing solid is selected from resin coated sand, resin coated bauxite, resin coated synthetic proppant, resin coated polymer beads, resin coated walnut shells, and mixtures of these materials. A preferred fusing solid of this type resin coated sand. The composition of this embodiment may also contain fibers, flakes, and/or a dispersant as described above. The composition of this embodiment may also contain an activator. The activator may be selected from the group consisting of an alcohol; an ester, an ether, an amide, a ketone, benzene sulfonic acid, sulfuric acid, methane sulfonic acid, trichloroacetic acid, hydrochloric acid, hydrofluoric acid, ferric chloride, toluene sulfonic acid, chlorobenzene sulfonic acid, nitric acid, perchloric acid, a water soluble multivalent metal salt catalyst comprising at least one multivalent ion of either manganese, zinc, cadmium, magnesium, cobalt, nickel, copper, tin, iron, lead, or calcium, and combinations of these.

In any of the above embodiments, the composition may also contain one or more than one of an antisettling agent, a fluid loss additive, and an antifoam agent. In any of the previous embodiments, the composition may also contain a weighting agent. The weighting agent may be selected from silica sand, barite, fly ash, calcium carbonate, hematite and mixtures of these materials. A preferred weighting agent is calcium carbonate. In any of the previous embodiments, the composition may contain an agent that lowers the fluid specific gravity rather than a weighting agent.

Another embodiment of the Invention is a composition, containing a fusing solid, for reducing fluid loss in downhole operations. The fusing solid may be gilsonite, asphalt, asphaltite, uintaite, uintahite, bitumen, wurzilite, glance pitch, grahamite, asphaltum, or mixtures of these materials. In a particularly preferred embodiment, the fusing solid is gilsonite. The composition may also contain fibers. The fibers may be selected from ceramics, glass, organic polymers, polyethylene terphthalate, aramids, novoloids, nylon, metals, aluminum, steel and mixtures of these materials. In a preferred embodiment, the fibers are glass or novoloid. The composition may also contain flakes. The flakes may be selected from mica, calcium carbonate, cellophane or mixtures of these materials. Mica is preferred. The composition may also contain a dispersant. The dispersant may be selected from lignosulfonates, lignites, humic acids, sulfonated styrene maleic anhydride copolymers, sulfonated naphthalene formaldehyde copolymers, polyacrylates, polyphosphates, modified tannins, zirconium citrate, dextrins, and mixtures of these materials.

In another embodiment, the fusing solid of the composition is selected from resin coated sand, resin coated bauxite, resin coated synthetic proppant, resin coated polymer beads, resin coated walnut shells, and mixtures of these materials. A preferred fusing solid of this type resin coated sand. The composition of this embodiment may also contain fibers, flakes, and/or a dispersant as described above. The composition of this embodiment may also contain an activator. The activator may be selected from the group consisting of an alcohol; an ester, an ether, an amide, a ketone, benzene sulfonic acid, sulfuric acid, methane sulfonic acid, trichloroacetic acid, hydrochloric acid, hydrofluoric acid, ferric chloride, toluene sulfonic acid, chlorobenzene sulfonic acid, nitric acid, perchloric acid, a water soluble multivalent metal salt catalyst comprising at least one multivalent ion of either manganese, zinc, cadmium, magnesium, cobalt, nickel, copper, tin, iron, lead, or calcium, and combinations of these.

DETAILED DESCRIPTION OF THE INVENTION

The Invention will be described in terms of treatment of vertical wells, but is equally applicable to wells of any orientation. The Invention will be described for hydrocarbon production wells, but it is to be understood that the Invention may be used for wells for production of other fluids, such as water or carbon dioxide, or, for example, for injection or storage wells. It should also be understood that throughout this specification, when a concentration or amount or other parameter range is described as being useful, or suitable, or the like, it is intended that any and every concentration or amount or other parameter within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventors appreciate and understand that any and all data points within the range are to be considered to have been specified, and that the inventors have possession of the entire range and all points within the range.

Although much of the following discussion emphasizes alleviation of lost circulation in drilling, the compositions and methods of the Invention may also be used in fluid loss control in other oilfield operations such as completion, cementing, remediation, and stimulation. The compositions and methods of the Invention may also be used to plug hydraulic fractures growing into regions in which they are not desired. The composition and methods of the Invention may also be used to plug hydraulic fractures in water bearing zones or to plug fractures in zones of water intrusion.

The invention is a wellbore control fluid that contains particles that can plug fissures or fractures efficiently to reinforce formation strength. The wellbore control fluid forms a solid mass when subjected to squeeze pressure. If the leak to be plugged is a new fracture (or a newly re-opened or further-opened fracture) that will close when pressure is released, the fluid remains in the fracture when the fracture is closing after the release of the squeeze pressure because the fluid is a slurry that solidifies or hardens inside the fracture because of the closure. The fluid does not set inside the wellbore and can be pumped through the drilling bottom hole assembly. The fluid is a slurry that contains particles that bridge in the fracture, preferably before the fracture closes, but necessarily after the fracture has closed. An important feature of the composition of the Invention is fusing particles of a solid that compact and harden into an impermeable mass when pressed together. Suitable materials may be illustrated by the following two types of materials. The first type is gilsonite or a similar material, for example natural asphalt, asphaltite, uintaite, uintahite, bitumen, wurzilite, glance pitch, grahamite, and asphaltum; the slurry preferably also contains a dispersant, flakes, and a fiber, and most preferably contains a dispersant and a fiber. The second such fusing solid is a resin coated sand, or similar material for example resin coated bauxite, resin coated synthetic proppant, resin coated polymer beads, and resin coated walnut shells, and, preferably, an activator. Any size range may be used, depending upon the surface equipment and the width of the fracture. Any curable, or partially cured, resin may be used, for example those commonly used for resin coated proppants, for example phenolic resins, furfuryl alcohol resins, novolac polymers, resole polymers, furan resins, phenolic-furan resins, phenolic-furan-formaldehyde terpolymers, and mixtures of these. The resin may be in multiple coats, for example a phenolic resin coat and a curable phenolic resin overcoat. The activator depends upon the nature of the resin and the temperature, but examples include an alcohol; an ester; an ether; an amide; a ketone; benzene sulfonic acid; sulfuric acid; methane sulfonic acid; trichloroacetic acid; hydrochloric acid; hydrofluoric acid; ferric chloride; toluene sulfonic acid; chlorobenzene sulfonic acid; nitric acid; perchloric acid; a water soluble multivalent metal salt catalyst comprising at least one multivalent ion of either manganese, zinc, cadmium, magnesium, cobalt, nickel, copper, tin, iron, lead, or calcium; and combinations of these. Of course, temperature may also be used to activate resin curing.

A pill containing a slurry of the fusing particles, and other necessary components, depending upon the choice of fusing particles, is injected across the loss or fractured zone and squeezed into the fractures. Once the squeeze pressure is released (bled off), the fracture closes on the fusing particles, and the closing pressure causes the fusing particles to bind to each other into a compact mass. As the fusing particles are compacted and fused, they are not expelled from the fracture into the wellbore upon pressure release and the mass stays inside the fracture.

Note that the second type of slurry, containing resin coated particles and an activator, may also be used to plug pre-existing fractures or voids by relying solely on the chemical reaction initiated by the activator, and not making use of squeeze or closure pressure. Care must be taken that none of the slurry of the second type is in a region that is not intended to be blocked, such as the wellbore. Testing of the resin and activator (chemistry and concentrations) should be done to ensure that a suitable plug is formed at the downhole temperature.

The present invention can be understood further from the following examples.

Example 1

Figure 1:
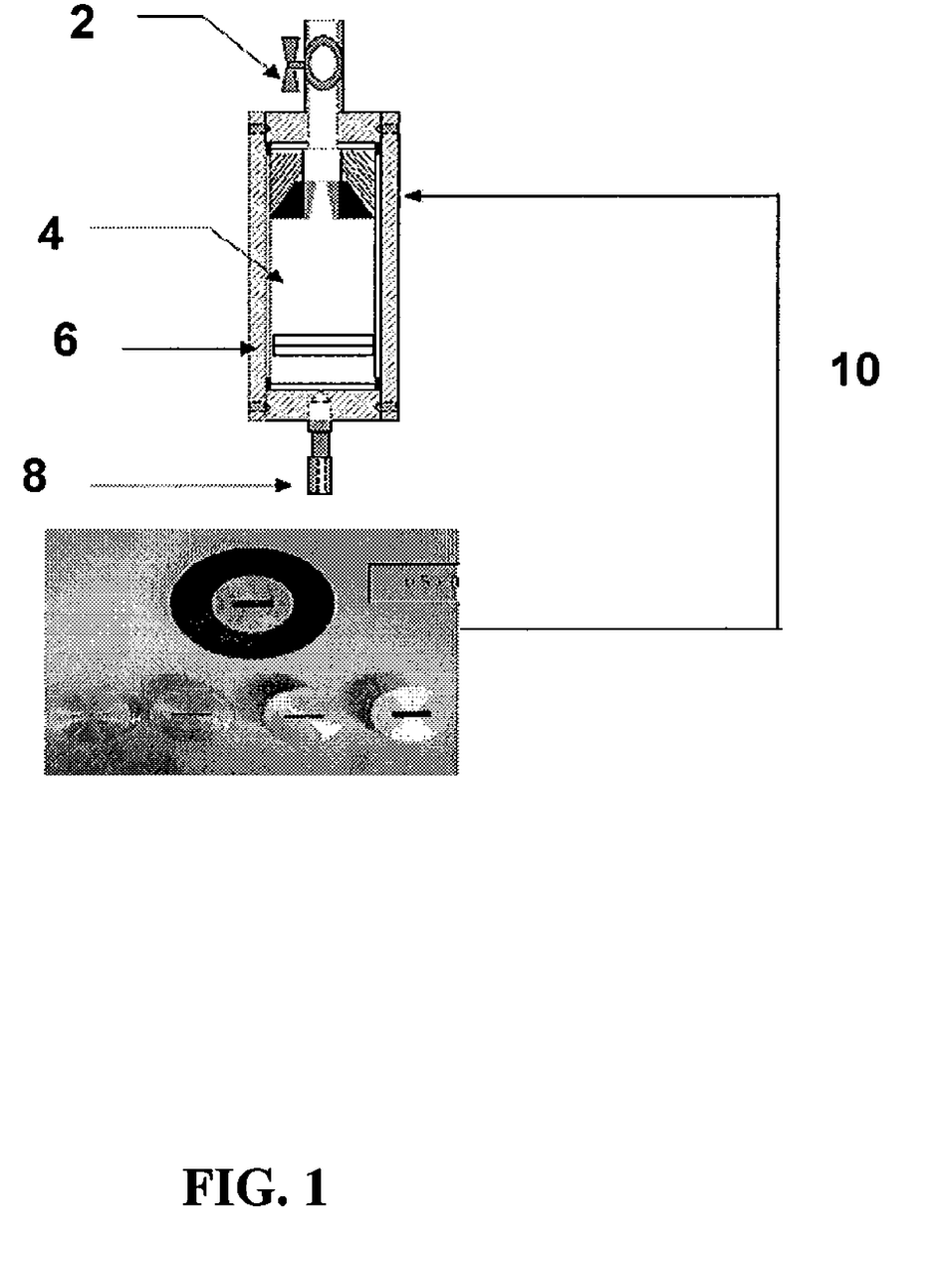
FIG. 1 shows a modified fluid loss cell fitted with a slot.

Experimental fluids were evaluated for fracture plugging, nozzle plugging, mixability, and durability. A modified Fluid Loss cell was fitted with either a slot or a drill bit nozzle. The cell fitted with the slot is shown in FIG. 1. The cell is fitted with a high-pressure valve [2] connected to a test fluid chamber [4] containing a piston [6]; a gas inlet [8] is at the bottom. The slot [10] was ⅛ inch (3.18 mm) wide and ½ inch (1.27 cm) long and was used to evaluate the ability of a fluid to plug a fracture. (Other slots were available and are shown at the bottom of the figure.) The nozzle was the smallest drill bit nozzle available in the industry (⁸⁄₃₂ inch) and was used to evaluate the ability of a fluid to flow through a drill bit. Only one nozzle was used as a restriction, instead of the three found in a normal drill bit; therefore, the flow area chosen in the test was very conservative. Each fluid tested was poured into the cell having either a nozzle or a slot and squeezed against the opening in steps from 100 to 500 psi. Mixability was evaluated by examining fluids for sedimentation or for abnormally high viscosity. Durability was evaluated by holding the fluid in the modified fluid loss cell after the slot (fracture) test at 13.8 MPa (2000 psi) and 62.8° C. (145° F.) for about 12 to 15 hours to simulate fracture closure after the end of a squeeze. The mass above the slot was then removed and examined for any compaction, solidification, or hardening. A fluid passed all tests if it plugged the slot but not the nozzle, was pumpable as mixed, and fused into a firm solid after squeezing.

Three fluids were prepared in the laboratory; each had a Solid Volume Fraction of 0.60; the fluids are shown in table I.

TABLE I

| Fluid A - Density 8.71 ppg (1.045 kg/L) | | |
|---|---|---|
| Antisettling agent | 3.000 lb/bbl (8.56 kg/m$^3$) | BW/V Water |
| Fiber | 2.000 lb/bbl (5.71 kg/m$^3$) | BW/V Total Fluid |
| Fine Flakes | 4.000 lb/bbl (11.41 kg/m$^3$) | BW/V Total Fluid |
| Medium Flakes | 4.000 lb/bbl (11.41 kg/m$^3$) | BW/V Total Fluid |
| Gilsonite | 144.30 lb/bbl (411.69 kg/m$^3$) | BW/V Total Fluid |
| Fluid B - Density 8.60 ppg (1.032 kg/L) | | |
| Antisettling Agent | 3.000 lb/bbl (8.56 kg/m$^3$) | BW/V Water |
| Fiber | 2.000 lb/bbl (5.71 kg/m$^3$) | BW/V Total Fluid |
| Gilsonite | 147.72 lb/bbl (421.44 kg/m$^3$) | BW/V Total Fluid |
| Fluid C - Density 8.74 ppg (1.049 kg/L) | | |
| Antifoam | 0.050 gal/bbl (1.23 l/m$^3$) | BW/V Total Fluid |
| Antisettling Agent | 3.000 lb/bbl (8.56 kg/m$^3$) | BW/V Water |
| Dispersant | 3.000 lb/bbl (8.56 kg/m$^3$) | BW/V Total Fluid |
| FLA | 3.000 lb/bbl (8.56 kg/m$^3$) | BW/V Total Fluid |
| Gilsonite | 139.63 lb/bbl (398.36 kg/m$^3$) | BW/V Total Fluid |
| Fiber | 2.000 lb/bbl (5.71 kg/m$^3$) | BW/V Total Fluid |
| Fine Flakes | 4.000 lb/bbl (11.41 kg/L) | BW/V Total Fluid |
| Medium Flakes | 4.000 lb/bbl (11.41 kg/m$^3$) | BW/V Total Fluid |
| Fluid D - Density 10.48 ppg (1.258 kg/L) | | |
| Antisettling Agent/ FLA | 1.500 lb/bbl (4.28 kg/m$^3$) | BW/V Water |
| Dispersant | 0.500 lb/bbl (1.43 kg/m$^3$) | BW/V Total Fluid |
| Gilsonite | 131.3 lb/bbl (374.60 kg/m$^3$) | BW/V Total Fluid |
| Calcium Carbonate | 131.0 lb/bbl (373.74 kg/m$^3$) | BW/V Total Fluid |
| Fiber | 2.000 lb/bbl (5.71 kg/m$^3$) | BW/V Total Fluid |
| Fluid E - Density 11.19 ppg (1.343.kg/L) | | |
| Antisettling Agent/ FLA | 1.500 lb/bbl (4.28 kg/m$^3$) | BW/V Water |
| Dispersant | 0.500 lb/bbl (1.43 kg/m$^3$) | BW/V Total Fluid |
| Gilsonite | 112.0 lb/bbl (319.54 kg/m$^3$) | BW/V Total Fluid |
| Calcium Carbonate | 180.1 lb/bbl (513.83 kg/m$^3$) | BW/V Total Fluid |
| Fiber | 1.000 lb/bbl (2.85 kg/m$^3$) | BW/V Total Fluid |

BW/V Water means percentage weight by volume of water in the fluid
BW/V Total Fluid means percentage weight by volume of the total fluid A summary of the test results is shown below in table II:

TABLE II

| Fluid | Slot Test | Nozzle Test | Mixability | Gilsonite fusing after the test |
|---|---|---|---|---|
| Fluid A | Plugged slot | Plugged Nozzle | Pumpable - Very thick | Solid - Crumbly (See FIG. 5) |
| Fluid B | Plugged slot | Plugged Nozzle | Pumpable - Thick | Not Tested |
| Fluid C | Plugged slot (See FIG. 2) | Nozzle not plugged* | Pumpable - Thick (See FIG. 3) | Solid - Set (See FIG. 4) |
| Fluid D | Plugged slot | Nozzle not plugged | Pumpable | Solid Set (See FIG. 6) |
| Fluid E | Plugged slot | Nozzle not plugged | Pumpable | Solid Set |

*Some wet gilsonite and loss control material (fiber and flakes) was left inside the cell above the nozzle.

TABLE III

| | Test 1 Fluid A | Test 2 Fluid A | Test 3 Fluid B | Test 4 Fluid C | Test 5 Fluid C | Test 6 Fluid A | Test 7 Fluid D | Test 8 Fluid E |
|---|---|---|---|---|---|---|---|---|
| Nozzle or Slot | Slot | Nozzle | Nozzle | Nozzle | Slot | Slot | Slot | Slot |
| 0.689 MPa (100 psi) | 130 cc - 60 sec | 50 cc - 60 sec | 0 cc - 60 sec | 225 cc - 60 sec | 200 cc - 60 sec | 130 cc - 60 sec | 10 cc - 60 sec | 20 cc - 60 sec |
| 1.379 MPa (200 psi) | 150 cc - 60 sec | 75 cc - 60 sec | 175 cc - 60 sec | 230 cc - 60 sec | 200 cc - 60 sec | 150 cc - 60 sec | 20 cc - 60 sec | 50 cc - 60 sec |
| 2.068 MPa (300 psi) | 160 cc - 60 sec | 110 cc - 60 sec | 200 cc - 60 sec | 235 cc - 60 sec | 200 cc - 60 sec | 160 cc - 60 sec | 20 cc - 60 sec | 50 cc - 60 sec |
| 2.758 MPa (400 psi) | 175 cc - 60 sec | 125 cc - 60 sec | 205 cc - 60 sec | 240 cc - 60 sec | 200 cc - 60 sec | 175 cc - 60 sec | 20 cc - 60 sec | 50 cc - 60 sec |
| 3.447 MPa (500 psi) | 180 cc - 60 sec | 135 cc - 60 sec | 205 cc - 60 sec (75 g left in cell) | 250 cc - 60 sec | 200 cc - 60 sec | 180 cc - 60 sec | 20 cc - 60 sec | 50 cc - 60 sec |

TABLE III-continued

| | Test 1 Fluid A | Test 2 Fluid A | Test 3 Fluid B | Test 4 Fluid C | Test 5 Fluid C | Test 6 Fluid A | Test 7 Fluid D | Test 8 Fluid E |
|---|---|---|---|---|---|---|---|---|
| FLAC | No | No | No | Yes | Yes | No | No | No |
| °C. (° F.) | 26.7 (80) | 62.8 (145) | 62.8 (145) | 62.8 (145) | 62.8 (145) | 37.8 (100) | 26.7 (80) | 26.7 (80) |
| Curing Conditions: | | | | | 8.274 MPa (1200 psi) - 12 hrs 62.8 C (145 F) Solid - Set | 8.274 MPa (1200 psi) - 12 hrs 37.8 C (100 F) Solid - Crumbly | 6.90 MPa (1000 psi) 2 hrs 76.7 C (170 F) Solid | 6.90 MPa (1000 psi) 2 hrs 76.7 C (170 F) Solid |
| CS MPa (psi) | | | | | | | 0.448 (65) | 1.172 (170) |

Notes:
The total fluid used was 300 to 325 cc.
The test started with 0.689 MPa (100 psi) pressure; if the fluid was stopped, the pressure was increased to 3.447 MPa (500 psi) for 60 seconds.

The details of selected tests were as shown in Table III, which gives the amount of total fluid passed through a given geometry (nozzle or slot) as a function of pressure. The flakes used in all of these fluids were mica; the fibers were fiberglass. The antisettling agent was a blend of a sulfonated organic polymer and a polysaccharide (D-glucopyranuronate with mannose and glucose). The FLAC was the ammonium salt of an acrylamido-methyl-propane sulfonate/acrylamide copolymer. The antifoam agent was polypropylene glycol, and the dispersant was sodium polynaphthalene sulfonate.

Figure 5:
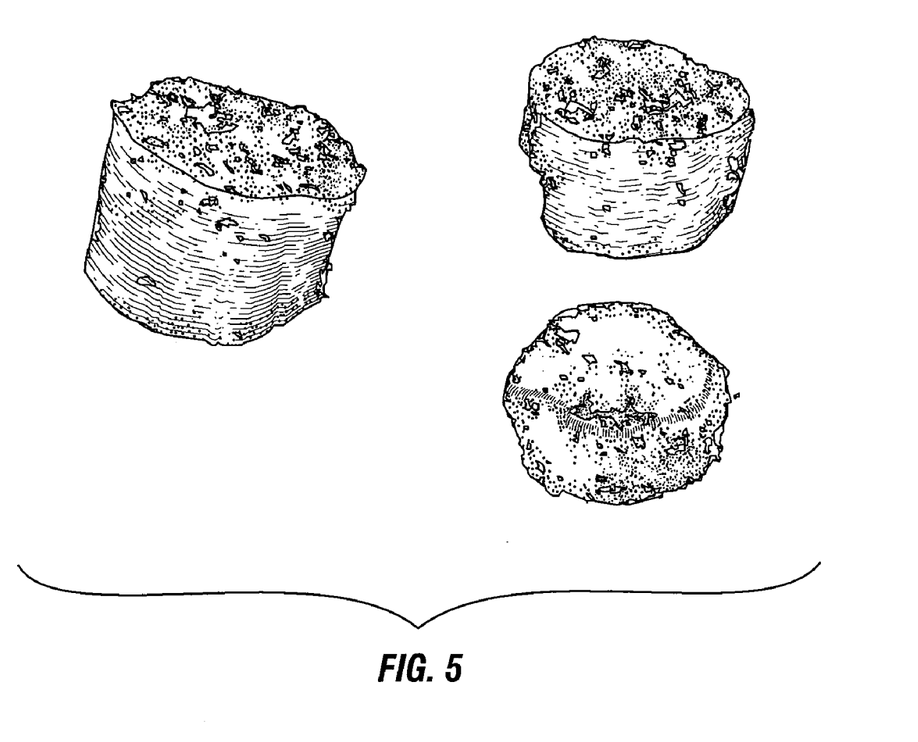
FIG. 5 shows compacted Fluid A material retrieved from the cell after the slot test.

Fluid A was the most efficient when it came to plugging the slot, because it contained both fiber and flakes and dehydrated quickly through the slot, making it very efficient. However, Fluid A did not pass the "nozzle test" and plugged the bit nozzle. It was very thick, and the fused solid after the tests was crumbly. FIG. 5 shows portions of compacted Fluid A material retrieved from the cell after a slot test.

Fluid B did not plug the slot as quickly as Fluid A and was not as thick, but eventually it also plugged both the slot and the nozzle. The material was not examined after the tests.

Figure 2:
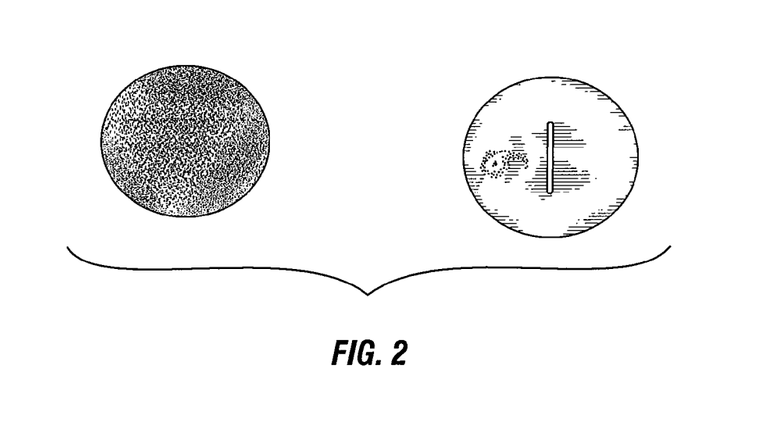
FIG. 2 shows a slot plugged by a lost circulation pill of Fluid C (left) compared to a slot prior to testing (right).
Figure 3:
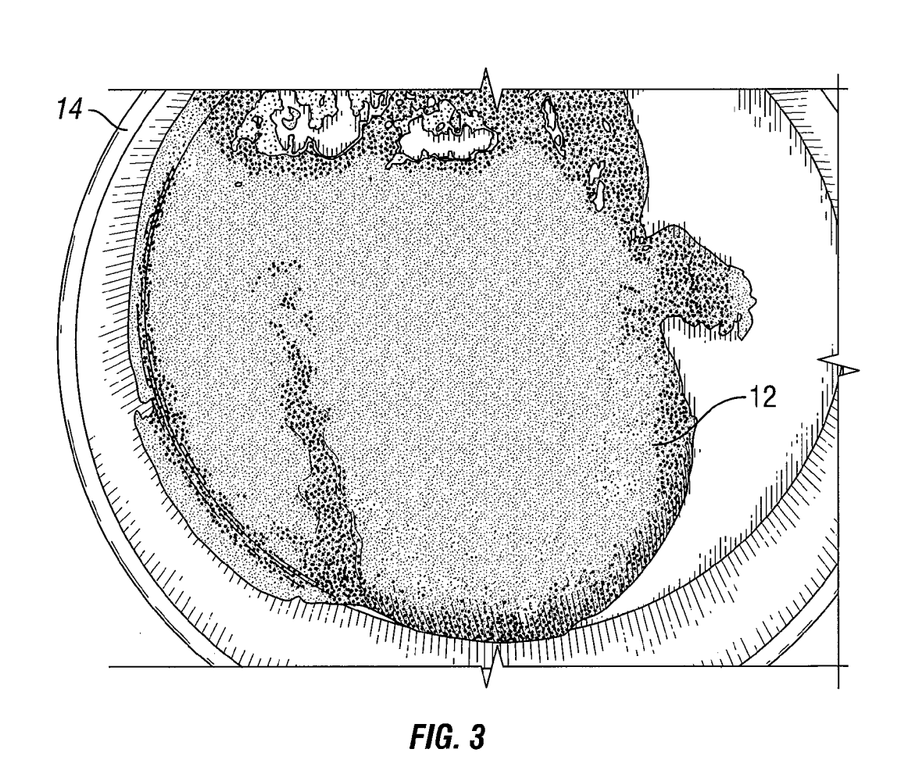
FIG. 3 shows the appearance of Fluid C as prepared.
Figure 4:
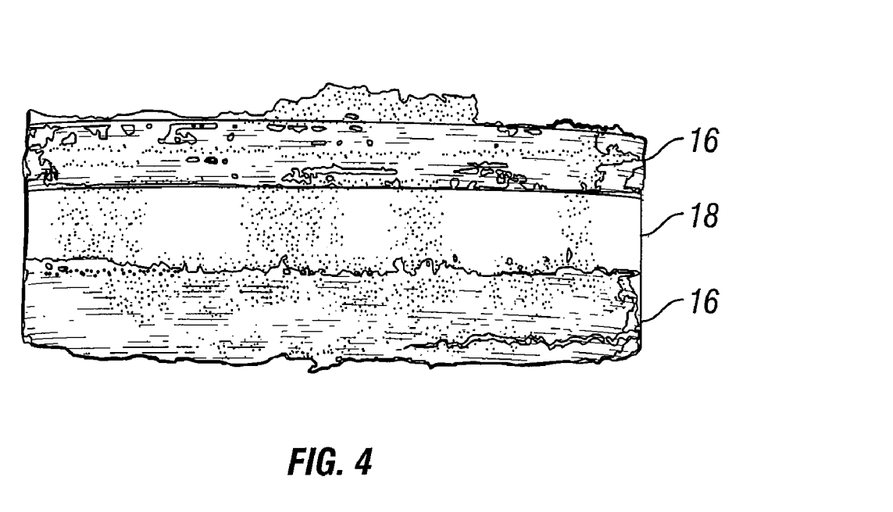
FIG. 4 shows Fluid C compacted and fused above and below the spacer ring above the slot after pressure had been applied in the slot test.

Fluid C plugged the slot (although not as quickly as Fluids A and B); however, Fluid C also passed through the nozzle without plugging it, and was less thick than Fluid A and Fluid B, so it was pumpable. The addition of a fluid loss control agent and dispersant provided a more stable fluid that did not dehydrate as quickly through a small restriction. FIG. 2 shows a slot plugged by a lost circulation pill of Fluid C on the left compared to a slot before testing shown on the right. FIG. 3 shows Fluid C as prepared [12] (a portion put into a beaker [14]). FIG. 4 shows Fluid C compacted and fused [16] above and below the spacer ring [18] above the slot after pressure had been applied in the slot test.

Figure 6:
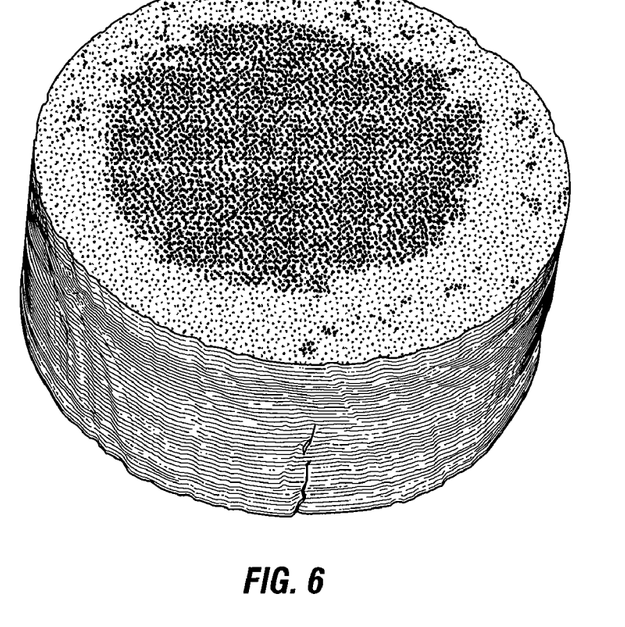
FIG. 6 shows compacted Fluid D material after curing for 2 hours in fluid loss cell at 6.90 MPa (1000 psi) and 76.7° C. (170° F.).

Fluids D and E plugged the slot (more quickly than Fluids A, B, and C). Fluids D and E also passed through the nozzle without plugging it, and were less thick than Fluid C, they were pumpable. The addition of an antisettling agent/fluid loss additive provided fluid stability; therefore, the fluids did not dehydrate quickly through a small restriction. The calcium carbonate was used as a weighting agent and to increase the solid volume fraction; it may also have helped in the compaction, as the compressive strength was good. Fluids D and E passed all tests and are robust gilsonite systems for plugging fractures or fissures initiated during squeezing. FIG. 6 shows compacted Fluid D material after curing for 2 hours in the fluid loss cell at 6.90 MPa (1000 psi) and 76.7° C. (170° F.).

Any antisettling agent may be used; typical materials are organoclays, laponite, xanthans, welan gums, and celluloses, for example HEC (hydroxyethyl cellulose). The concentration may range from about 8.56 to about 85.6 kg/m$^3$ (about 3 to about 30 lb/bbl), with lower concentrations preferred. Any fiber may be used, especially those used in oilfield fluids; examples include ceramics, for example glass, organic polymers, for example polyethlene terphthalate, aramids, and nylon, and metals, for example aluminum and steel; glass is preferred. The fiber must be insoluble and must not interact chemically with other components of the system. The concentration may be from about 1.43 to about 14.27 kg/m$^3$ (about 0.5 to about 5 lb/bbl), with about 5.71 kg/m$^3$ (about 2 lb/bbl) preferred. The fiber preferably has a length up to about 2 mm and a diameter of from about 6 to about 100 microns, although other sizes may be used. The fine and medium flakes may be made of any material (again provided that they are insoluble and do not interact chemically with other components of the fluid); preferred materials include those used for fluid loss control in oilfield fluids, for example mica, calcium carbonate, and cellophane; a preferred example is mica. They are optional but preferred and may be used at concentrations of from 0 to about 57.08 kg/m$^3$ (about 20 lb/bbl). The gilsonite used had a size range of from about 100 to about 600 microns; any size range may be used; the preferred range for lost circulation is from about 100 to about 500 microns. The concentration used is selected so that the total solids fraction ranges from about 40 to about 60% for gilsonite-containing slurries and about 35 to about 60% for resin-coated sand containing slurries. Higher concentrations may be used if the slurry is pumpable. For gilsonite, that is about 285.4 to about 713.5 kg/m$^3$ (about 100 to about 250 lb/bbl). Gilsonite is a natural antifoaming agent, although an additional antifoaming agent or defoaming agent may be used. Any such agent may be used (provided that it is compatible with all the other components); the concentration may range from 0 to about 12.3 l/m$^3$ (about 0.5 gal/bbl). Suitable antifoam agents include polypropylene glycol, polydimethylsilanes, silicones, and mixtures of these materials. Any dispersant may be used (again provided that it is compatible with all the other components); examples include lignosulfonates, lignites, humic acids, sulfonated styrene maleic anhydride copolymers, sulfonated naphthalene formaldehyde copolymers, polyacrylates, polyphosphates, modified tannins, zirconium citrate, and dextrins. The FLA (fluid loss additive) may be any known in the industry; it is optional, but is recommended if the fluid is to be pumped through small restrictions, for example bit nozzles. Suitable materials include polyethyleneimines, acrylamide-AMPS copolymers, hydroxyethyl cellulose, carboxymethyl cellulose, crosslinked microgels, bentonite, latexes, and polyvinyl alcohols. Suitable concentrations are from 0 to about 123 l/m$^3$ (about 5 gal/bbl) for liquids and from 0 to about 28.54 kg/m$^3$ (about 10 lb/bbl) for solids.

Weighting agents, for example silica sand, barite, fly ash, calcium carbonate and hematite, may be added to achieve higher fluid densities. Microspheres (cenospheres or glass bubbles) may be used to achieve lower fluid densities.

Although Fluids C, D and E did pass through the small 0.635 mm restriction (⅜₃₂" nozzle), these fluids may also be pumped through a ball-operated valve placed above the drilling bottom hole assembly. In some cases, this may be preferred.

It was observed that in order for the gilsonite to compact and fuse in the fracture or fissure, water must be filtered out from the fluid loss control pill; therefore it is necessary for some water to be lost inside the fracture.

Fluid C was cured at 76.7° C. (170° F.) and 6.90 MPa (1000 psi) for 1 hour. The cell was then cooled to ambient temperature, the piston was removed, and 250-300 ml water was placed on the piston side of the sample. Pressure was applied at 0, 0.345, 0.689, 1.379, 2.758 and 4.137 MPa (0, 50, 100, 200, 400, and 600 psi) for 5-10 minutes. The plug was tightly compacted under these conditions and maintained its structure even after water exposure at differential pressures up to 4.137 MPa (600 psi).

Example 2

The four tests conducted were the same as in Example 1, except that the durability was evaluated by holding the fluid in the modified fluid loss cell after the slot (fracture) test at 76.7° C. (170° F.) and 6.90 MPa (1000 psi) for about 1 hour.

Four fluids were tested. Each contained 0.25 to 0.42 mm (40/60 mesh) Accupak Ottawa sand coated with about 2 to 4% curable phenolic resin, and having a specific gravity of about 2.56. Each also contained as an activator a Santrol (Fresno, Tex., U.S.A.) product, Superset P, which is a mixture of 25% methanol, 25% poly(oxyethylene)nonylphenol ether, and 50% di(ethyleneglycol) ethyl ether acetate. When compressed at elevated temperature, preferably with an activator, such materials fuse and create a solid mass. This material acts as both a plugging agent (fusing sold) and as a bridging agent. All other components, if used in the mixtures, were the same as in Example 1.

The four fluids tested are shown below in Table IV; all were made up in deionized water. The concentration of the antisettling agent was based on the water; all other concentrations were based on the total fluid. SVF is Solid Volume Fraction. The activator in these tests was a blend of toluene sulfonic acid and xylene sulfonic acid.

A summary of the tests results is shown in Table V:

TABLE V

| Fluid | Slot Test | Nozzle Test | Mixability | Durability |
|---|---|---|---|---|
| Fluid F | Passed Through Slot | Passed through Nozzle* | Pumpable - Thick | Not Tested |
| Fluid G | Plugged Slot | Passed through Nozzle* | Pumpable - Thick | Solid - Set After 24 Hours |
| Fluid H | Plugged Slot | Plugged Nozzle** | Pumpable - Very Thick | Solid - Set After 24 Hours |
| Fluid I | Not Tested | Not Tested | Too Thick | Not Tested |

Figure 7:
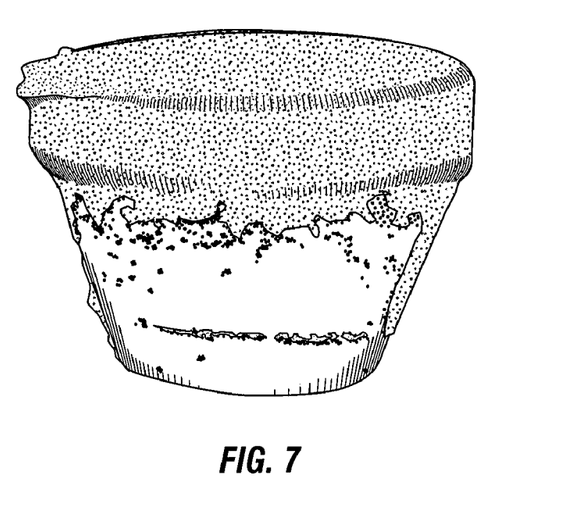
FIG. 7 shows Fluid G plugging off above the ⅛ inch (0.318 cm) slot.

*Small amounts of wet 0.25 to 0.42 mm (40/60 mesh) Accupak and FLA material were left inside the cell above the nozzle
*A large plug was left inside the cell above the nozzle In more detail, fluid F passed the nozzle test but failed the slot test; the durability test was not done. Fluid F had the lowest concentrations of fibers and flakes, so it was the most pumpable, but it did not plug either the nozzle or the slot. Fluid G plugged off above the slot and passed all four tests; it was the only fluid to pass through the nozzle and yet plug the slot. It therefore is able to pass through the smallest bit nozzle currently in commercial use and plug fractures up to at least 0.318 mm (⅛ inch) in width. It was thick but pumpable due to the intermediate levels of fibers and flakes. FIG. 7 shows Fluid G plugging off above the ⅛ inch (0.318 cm) slot.

Fluid H contained the highest concentrations of fibers and flakes, so it plugged the slot very efficiently, but it also plugged the nozzle. Fluid I was too thick during preparation, and could not be pumped and was not tested further.

Although Fluid G did pass through the small restriction, in this case an 0.635 mm (⅜₃₂ inch) nozzle, the fluid of the Invention may also be pumped through a ball-operated valve placed above the drilling bottom hole assembly. In some cases, this may be preferred.

It was observed that in order for the curable resin coated particles to compact and fuse in the fracture or fissure, water must be filtered out from the fluid loss control pill; therefore it is necessary for some water to be lost inside the fracture.

TABLE IV

| Component | Fluid F (density 1.536 kg/L (12.8 ppg); SVF 35%) | Fluid G (density 1.512 kg/L (12.6 ppg); SVF 35%) | Fluid H (density 1.50 kg/L (12.5 ppg); SVF 35%) | Fluid I (density 1.776 kg/L (14.8 ppg); SVF 50%) |
|---|---|---|---|---|
| Antisettling agent, kg/m³ (lb/bbl) | 45.65 (16) | 45.65 (16) | 45.65 (16) | 5.71 (2) |
| FLA, L/m³ (gal/bbl) | 36.9 (1.5) | 36.9 (1.5) | 36.9 (1.5) | 36.9 (1.5) |
| Antifoam, L/m³ (gal/bbl) | 7.38 (0.3) | 7.38 (0.3) | 7.38 (0.3) | 7.38 (0.3) |
| Fiber, kg/m³ (lb/bbl) | 2.85 (1) | 5.71 (2) | 9.99 (3.5) | 1.14 (0.4) |
| Medium flakes, kg/m³ (lb/bbl) | 5.71 (2) | 11.41 (4) | 19.97 (7) | 2.28 (0.8) |
| Fine flakes, kg/m³ (lb/bbl) | 5.71 (2) | 11.41 (4) | 19.97 (7) | 2.28 (0.8) |
| Activator, L/m³ (gal/bbl) | 7.87 (0.32) | 7.87 (0.32) | 7.87 (0.32) | 7.87 (0.32) |
| 40/60 Accupak, kg/m³ (lb/bbl) | 821.38 (287.9) | 800.27 (280.5) | 768.60 (269.4) | 1237.92 (433.9) |

Having thus described our invention, we claim:

1. A method for reducing fluid loss in downhole operations comprising injecting a composition comprising a fusing solid into the fluid loss flow path in a formation matrix and allowing the fusing solid to fuse at formation temperature when the injection pressure is released and the formation matrix surfaces forming the fluid loss flow path close on the composition, wherein the composition is injected in the form of a pill and wherein the fusing solid is present at a concentration between about 285 kg/m$^3$ and about 821 kg/m$^3$.

2. The method of claim 1 wherein the fusing solid is selected from the group consisting of asphalt, asphaltite, uintaite, uintahite, bitumen, wurzilite, glance pitch, grahamite, asphaltum, and mixtures thereof.

3. The method of claim 2 wherein the composition further comprises a dispersant.

4. The method of claim 3 wherein the dispersant is selected from the group consisting of lignosulfonates, lignites, humic acids, sulfonated styrene maleic anhydride copolymers, sulfonated naphthalene formaldehyde copolymers, polyacrylates, polyphosphates, modified tannins, zirconium citrate, dextrins, and mixtures thereof.

5. The method of claim 1 wherein the composition further comprises fibers.

6. The method of claim 5 wherein the fibers are selected from the group consisting of ceramics, glass, organic polymers, polyethylene terephthalate, aramids, novoloids, nylon, metals, aluminum, steel and mixtures thereof.

7. The method of claim 6 wherein the fibers are glass or novoloid.

8. The method of claim 1 wherein the composition further comprises flakes.

9. The method of claim 8 wherein the flakes are selected from the group consisting of mica, calcium carbonate, cellophane, and mixtures thereof.

10. The method of claim 9 wherein the flakes are mica.

11. The method of claim 1 wherein the fusing solid is selected from the group consisting of curable or partially curable resin coated sand, curable or partially curable resin coated bauxite, curable or partially curable resin coated synthetic proppant, curable or partially curable resin coated polymer beads, curable or partially curable resin coated walnut shells and mixtures thereof.

12. The method of claim 11 wherein the fusing solid is curable or partially curable resin coated sand.

13. The method of claim 11 wherein the composition further comprises an activator.

14. The method of claim 13 wherein the activator is selected from the group consisting of an alcohol, an ester, an ether, an amide, a ketone, benzene sulfonic acid, sulfuric acid, methane sulfonic acid, trichloroacetic acid, hydrochloric acid, hydrofluoric acid, ferric chloride, toluene sulfonic acid, chlorobenzene sulfonic acid, nitric acid, perchloric acid, a water soluble multivalent metal salt catalyst comprising at least one multivalent ion of either manganese, zinc, cadmium, magnesium, cobalt, nickel, copper, tin, iron, lead, or calcium, and combinations thereof.

15. The method of claim 1 wherein the composition further comprises a weighting agent.

16. The method of claim 15 wherein the weighting agent is selected from the group consisting of silica sand, barite, fly ash, calcium carbonate, hematite and mixtures thereof.

17. The method of claim 16 wherein the weighting agent is calcium carbonate.

18. The method of claim 1 wherein the fusing solid is uintaite, uintahite, or both.

19. The method of claim 1 wherein the composition further comprises one or more than one of an antisettling agent, a fluid loss additive, and an antifoam agent.

20. The method of claim 1 wherein the composition further comprises an agent that lowers the fluid specific gravity.

21. A composition for reducing fluid loss in downhole operations comprising a fusing solid, wherein the composition is in the form of a pill and the fusing solid is present at a concentration between about 285 kg/m$^3$ and about 821 kg/m$^3$.

22. The composition of claim 21 wherein the composition further comprises fibers.

23. The composition of claim 22 wherein the fibers are selected from the group consisting of ceramics, glass, organic polymers, polyethylene terephthalate, aramids, novoloids, nylon, metals, aluminum, steel and mixtures thereof.

24. The composition of claim 23 wherein the fibers are glass or novoloid.

25. The composition of claim 21 wherein the composition further comprises flakes.

26. The composition of claim 25 wherein the flakes are selected from the group consisting of mica, calcium carbonate, cellophane, and mixtures thereof.

27. The composition of claim 26 wherein the flakes are mica.

28. The composition of claim 21 wherein the composition further comprise a weighting agent.

29. The composition of claim 28 wherein the weighting agent is selected from the group consisting of silica sand, barite, fly ash, calcium carbonate, hematite and mixtures thereof.

30. The composition of claim 29 wherein the weighting agent is calcium carbonate.

31. The composition of claim 21 wherein the fusing solid is selected from the group consisting of asphalt, asphaltite, uintaite, uintahite, bitumen, wurzilite, glance pitch, grahamite, asphaltum, and mixture thereof.

32. The composition of claim 31 wherein the fusing solid is uintaite, uintahite, or both.

33. The composition of claim 21 wherein the composition further comprises a dispersant.

34. The composition of claim 21 wherein the dispersant is selected from the group consisting of lignosulfonates, lignites, humic acids, sulfonated styrene maleic anhydride copolymers, sulfonated naphthalene formaldehyde copolymers, polyacrylates, polyphosphates, modified tannins, zirconium citrate, dextrins, and mixtures thereof.

35. The composition of claim 21 wherein the fusing solid is selected from the group consisting of curable or partially curable resin coated sand, curable or partially curable resin coated bauxite, curable or partially curable resin coated synthetic proppant, curable or partially curable resin coated polymer beads, curable or partially curable resin coated walnut shells and mixtures thereof.

36. The composition of claim 35 wherein the fusing solid is curable or partially curable resin coated sand.

37. The composition of claim 21 wherein the composition further comprises an activator.

38. The composition of claim 37 wherein the activator is selected from the group consisting of an alcohol, an ester, an ether, an amide, a ketone, benzene sulfonic acid, sulfuric acid, methane sulfonic acid, trichloroacetic acid, hydrochloric acid, hydrofluoric acid, ferric chloride, toluene sulfonic acid, chlorobenzene sulfonic acid, nitric acid, perchloric acid, a water soluble multivalent metal salt catalyst comprising at least one multivalent ion of either manganese, zinc, cadmium, magnesium, cobalt, nickel, copper, tin, iron, lead, or calcium, and combinations thereof.

39. The composition of claim 21 wherein the composition further comprises one or more than one of an antisettling agent, a fluid loss additive, and an antifoam agent.

40. The composition of claim 21 wherein the composition further comprises an agent that lowers the fluid specific gravity.

* * * * *